US009298278B2

(12) United States Patent
Kim

(10) Patent No.: US 9,298,278 B2
(45) Date of Patent: Mar. 29, 2016

(54) TOUCH SENSITIVE DISPLAY DEVICE FOR CONVERTING A WORD TO A SOFT BUTTON, AND SELECTING THE SOFT BUTTON TO INPUT THE WORD ON AN INPUT INTERFACE AND CONTROLLING METHOD THEREOF

(71) Applicant: LG ELECTRONICS INC., Seoul (KR)

(72) Inventor: Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

(21) Appl. No.: 13/777,384

(22) Filed: Feb. 26, 2013

(65) Prior Publication Data
US 2014/0208255 A1    Jul. 24, 2014

(30) Foreign Application Priority Data
Jan. 22, 2013  (KR) .................. 10-2013-0006834

(51) Int. Cl.
*G06F 3/033* (2013.01)
*G06F 3/00* (2006.01)
*G06F 3/023* (2006.01)
*G06F 17/21* (2006.01)
*G06F 3/0488* (2013.01)

(52) U.S. Cl.
CPC ............ *G06F 3/0236* (2013.01); *G06F 3/0237* (2013.01); *G06F 3/04886* (2013.01); *G06F 17/21* (2013.01)

(58) Field of Classification Search
CPC ......... G06F 17/30; G06F 15/00; G06F 3/033; G06F 3/041; G06F 3/00; G06F 17/21; H04B 1/38

USPC .................... 715/256, 863; 345/173
See application file for complete search history.

(56) References Cited

U.S. PATENT DOCUMENTS 7,453,439 B1 * 11/2008 Kushler et al. ................ 345/168
8,275,618 B2 *  9/2012 Ganong, III .................. 704/251
8,294,680 B2   10/2012 Karlsson
(Continued)

FOREIGN PATENT DOCUMENTS

EP          2469398 A2   6/2012
WO    WO 2011/084157 A1   7/2011
(Continued)

OTHER PUBLICATIONS

Verma, "Google Translate Product Release Blog", published Jan. 12, 2011.*

*Primary Examiner* — Cesar Paula
*Assistant Examiner* — Jian Huang
(74) *Attorney, Agent, or Firm* — Birch, Stewart, Kolasch & Birch, LLP

(57) ABSTRACT

A method of controlling a touch sensitive display device according to one embodiment of the present specification may include the steps of displaying a graphic user interface including a first area of a virtual keyboard and a second area of a digital content containing at least one word, detecting a first contact from the first area, displaying and moving a word-selecting interface according to the first contact moving from the first area to the second area, displaying the at least one word overlapped by the word-selecting interface in the digital content as a soft button, detecting a second contact from the soft button, and inputting a word corresponding to the soft button from which the second contact is detected into a text input box.

21 Claims, 16 Drawing Sheets

(56) References Cited

U.S. PATENT DOCUMENTS

| | | |
|---|---|---|
| 2007/0038941 A1* | 2/2007 | Wysocki et al. ............... 715/748 |
| 2007/0130607 A1* | 6/2007 | Thissen et al. ................ 725/132 |
| 2007/0293273 A1* | 12/2007 | Rochford ...................... 455/566 |
| 2008/0009300 A1* | 1/2008 | Vuong .......................... 455/466 |
| 2009/0172560 A1* | 7/2009 | Cole et al. .................... 715/744 |
| 2010/0231529 A1 | 9/2010 | Tikka |
| 2010/0235793 A1* | 9/2010 | Ording et al. ................. 715/863 |
| 2011/0289406 A1 | 11/2011 | Wassingbo |
| 2012/0054211 A1* | 3/2012 | Arsenault et al. ............. 707/755 |

FOREIGN PATENT DOCUMENTS

| | | |
|---|---|---|
| WO | WO 2012/161359 A1 | 11/2012 |
| WO | WO 2012/162895 A1 | 12/2012 |

* cited by examiner

TOUCH SENSITIVE DISPLAY DEVICE FOR CONVERTING A WORD TO A SOFT BUTTON, AND SELECTING THE SOFT BUTTON TO INPUT THE WORD ON AN INPUT INTERFACE AND CONTROLLING METHOD THEREOF

This application claims the benefit of the Korean Patent Application No. 10-2013-0006834, filed on Jan. 22, 2013, which is hereby incorporated by reference as if fully set forth herein.

BACKGROUND OF THE INVENTION

1. Field of the Invention

The present specification relates to a touch sensitive display device, and more particularly, to a touch sensitive display device providing a text input interface and a controlling method thereof.

2. Discussion of the Related Art

As a touch sensitive display unit is disseminated, a device receiving a text as an input in a manner of displaying a virtual keyboard instead of a keyboard, which is a separate text input device, is increasing. A user is able to input a preferred text by touching keys of the displayed virtual keyboard. And, since the virtual keyboard is temporarily displayed in case that a text input is required, there exist a merit in that it can be used as an input device only when a necessity arises while a display area is retained.

Yet, due to a limited size of a display unit, the virtual keyboard provides relatively small keys. Thus, in case of a text input using the virtual keyboard, there is a problem that it is difficult for a user to precisely select and touch a desired key. And, since one character is inputted by one touch input, there is a problem that a time for a user to input a text may increase.

SUMMARY OF THE INVENTION

Accordingly, the present specification is directed to a touch sensitive display device for providing an input interface and a controlling method thereof that substantially obviate one or more problems due to limitations and disadvantages of the related art. In particular, the touch sensitive display device in the present specification needs to provide a user with a text input method, which reduces a text input time and easy to use.

To achieve these objects and other advantages and in accordance with the purpose of the specification, as embodied and broadly described herein, a touch sensitive display device according to one embodiment of the present specification includes a display unit configured to display a graphic user interface, a sensor unit configured to sense a contact with the display unit and a controller configured to control the display unit and the sensor unit, wherein the graphic user interface includes a first area of a virtual keyboard and a second area of a digital content containing at least one word and wherein the controller configured to detect a first contact from the first area, configured to display/move a word-selecting interface in accordance with the first contact moving from the first area to the second area, configured to display the at least one word overlapped by the word-selecting interface in the digital content as soft buttons, respectively, configured to detect a second contact from the soft button, and configured to input a word corresponding to the soft button from which the second contact is detected into a text input box.

To further achieve these and other advantages and in accordance with the purpose of the present specification, a method of controlling a touch sensitive display device according to one embodiment of the present specification includes the steps of displaying a graphic user interface including a first area of a virtual keyboard and a second area of a digital content containing at least one word using a display unit, detecting a first contact from the first area using a sensor unit, displaying and moving a word-selecting interface according to the first contact moving from the first area to the second area using a controller, displaying the at least one word overlapped by the word-selecting interface in the digital content as a soft button using the controller, detecting a second contact from the soft button using the sensor unit, and inputting a word corresponding to the soft button from which the second contact is detected into a text input box using the controller.

Advantageous Effects

According to the present specification, a touch sensitive display device may provide a word-selecting interface, which inputs in a manner of selecting a displayed digital content.

And, according to the present specification, the touch sensitive display device may input a desired text by a word-unit.

And, according to the present specification, the touch sensitive display device may provide a word-selecting interface, which inputs in a manner of converting a displayed digital content.

And, according to the present specification, the touch sensitive display device may provide a word-selecting interface, which inputs in a manner of searching for a desired word in a displayed digital content.

And, according to the present specification, the touch sensitive display device may provide a word-selecting interface, which inputs in a manner of translating a word included in a displayed digital content.

DETAILED DESCRIPTION OF THE INVENTION

In the following description, embodiments are explained in detail with reference to the attached drawings and the contents written on them. A scope intended to claim may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a touch sensitive display device may include at least one of a smart phone, a smart pad, a tablet computer, a notebook and a monitor.

Figure 1:
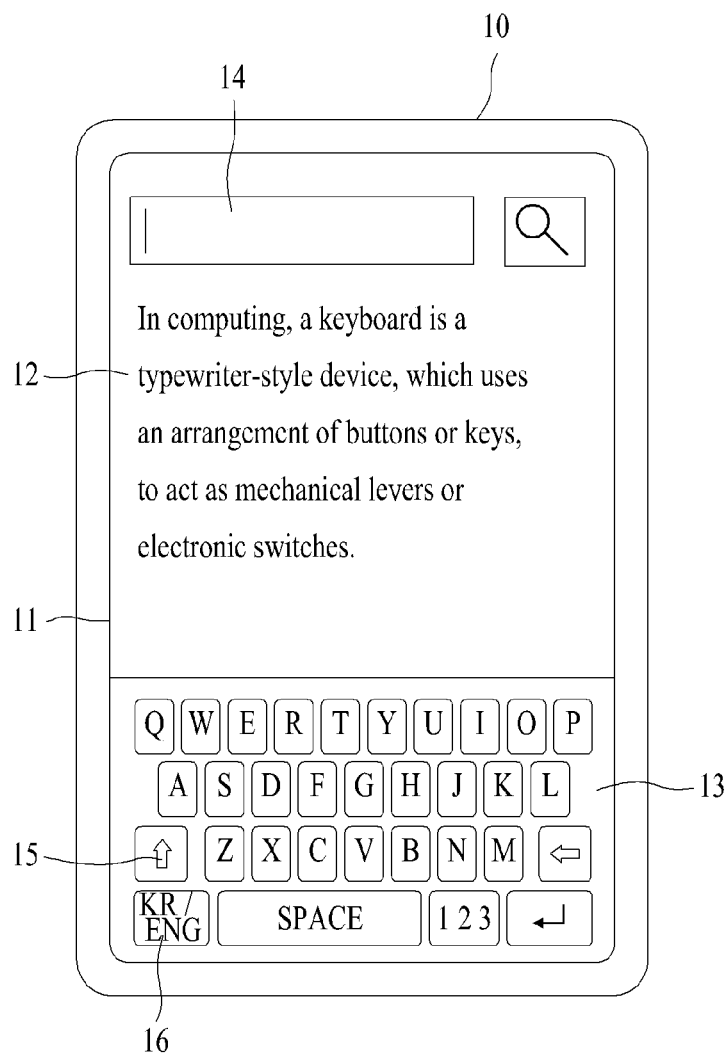
FIG. 1 is a diagram for showing a method of providing a virtual keyboard of a touch sensitive display device according to one embodiment.

FIG. 1 is a diagram for showing a method of providing a virtual keyboard of a touch sensitive display device according to one embodiment. The touch sensitive display device 10 may include a display unit 11. In the present specification, the touch sensitive display device 10 may display a graphic user interface in the display unit 11. The touch sensitive display device 10 displays a virtual keyboard 13 in a first area of the display unit 11 and may display a digital content 12 in a second area.

The touch sensitive display device 10 may display a virtual keyboard 13 in a first area of the display unit 11. The virtual keyboard 13 is a virtual keyboard displayed in the display unit. The touch sensitive display device 10 senses a contact with the virtual keyboard 13 using a sensor unit and may input a letter displayed in the position from which the contact is sensed into a text input box 14.

The touch sensitive display device 10 may include letter keys from A to Z, a shift key 15, a number shift key and a language shift key 16 as a virtual keyboard. In this case, the shift key 15 may convert a character of the letter key to an upper case or a lower case. And, the language shift key 16 may convert a language of the displayed letter key. In particular, in case that a contact is inputted to the language shift key 16, the touch sensitive display device 10 may convert a language of the letter key to a different language. For instance, in case that the alphabet letter keys are displayed as shown in FIG. 1, if a contact is inputted to the language shift key 16, the touch sensitive display device 10 may display in a manner of converting the alphabet letter keys to Korean letter keys. And, the number shift key may display numbers in the letter keys.

The touch sensitive display device 10 may provide a user with a digital content 12 by displaying it in a second area of a display unit 11. In this case, the digital content 12 may include a digital content received via a network as well as a content stored in the touch sensitive display device 10. And, the digital content 12 may include a text.

The touch sensitive display device 10 may display a text input box 14 together with the digital content 12. The text input box 14 is an interface capable of receiving a text inputted by a user. The touch sensitive display device 10 may receive a text as an input intended by a user to be inputted using the text input box 14. The touch sensitive display device 10 may search for a digital content based on the inputted text.

Figure 2A:
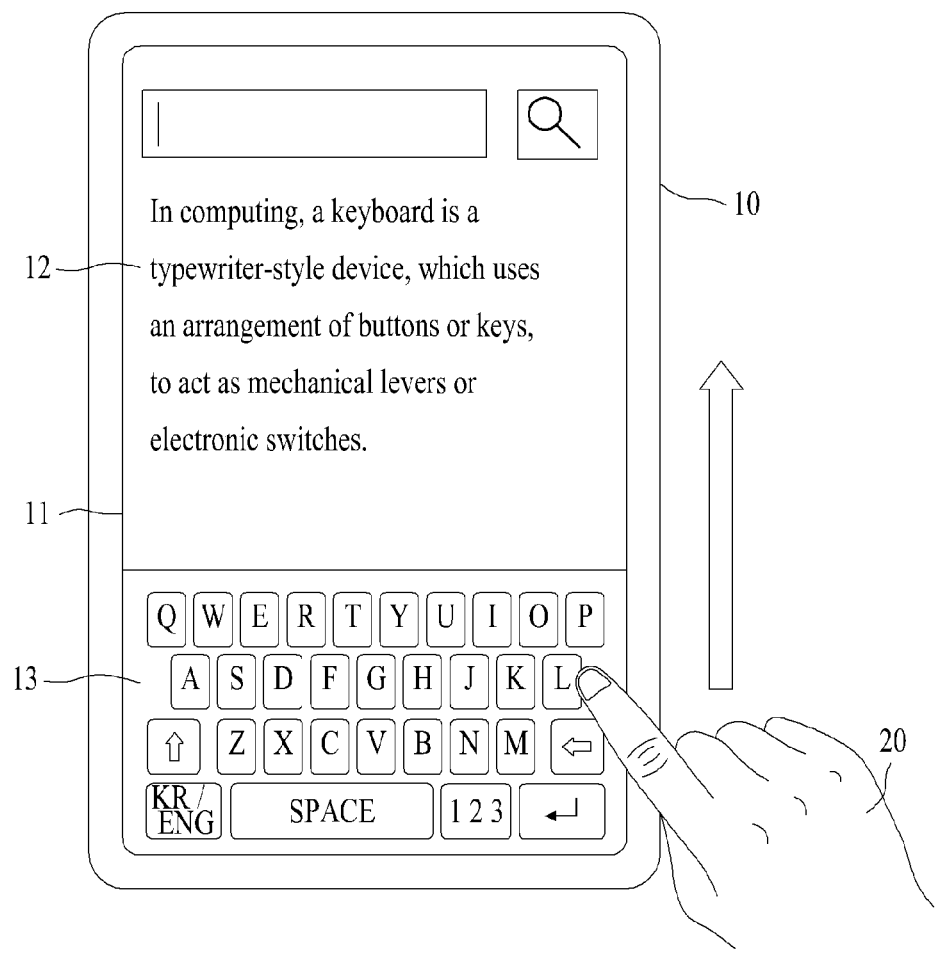
FIGS. 2a/2b is a diagram for showing a method of generating a word-selecting interface according to one embodiment.

FIGS. 2a/2b is a diagram for showing a method of generating a word-selecting interface according to one embodiment. As shown in FIG. 2a, the touch sensitive display device 10 may display a graphic user interface in a display unit 11. The touch sensitive display device 10 displays a virtual keyboard 13 in a first area of the graphic user interface and may display a digital content 12 in a second area. The touch sensitive display device 10 may sense a contact 20 with the first area using a sensor unit. If the sensed contact 20 with the first area moves to the second area while maintaining the contact with the display unit, the touch sensitive display device 10 may generate a word-selecting interface. The touch sensitive display device 10 may activate the word-selecting interface when the contact passes by the boundary of the first area and the second area.

In the present specification, the word-selecting interface may mean an input interface capable of inputting the text of a digital content in a manner of selecting according to a word. The touch sensitive display device 10 may display the text overlapped by the word-selecting interface in a manner of converting to a soft button of a word-unit. The soft button may indicate a button displayed by the display unit. If a contact of a user is detected from the soft button, the touch sensitive display device 10 may execute a function configured to the soft button. In the present specification, the touch sensitive display device 10 may configure a function of inputting a text in the text input box as the function of the soft button.

For instance, if the word-selecting interface overlaps a first word and a second word, the touch sensitive display device 10 may display the first word and the second word in a manner of converting to a first soft button and a second soft button, respectively. And, the touch sensitive display device 10 may input the first word into the text input box if a contact is detected from the first soft button and may input the second word into the text input box if a contact is detected from the second soft button.

The above-mentioned word-selecting interface may overlap one or more text lines. And, the size of the word-selecting interface can be controlled by a contact of a user. The touch sensitive display device 10 senses a contact to control the size of the word-selecting interface and may control the size of the word-selecting interface in accordance with the sensed contact.

Figure 2B:
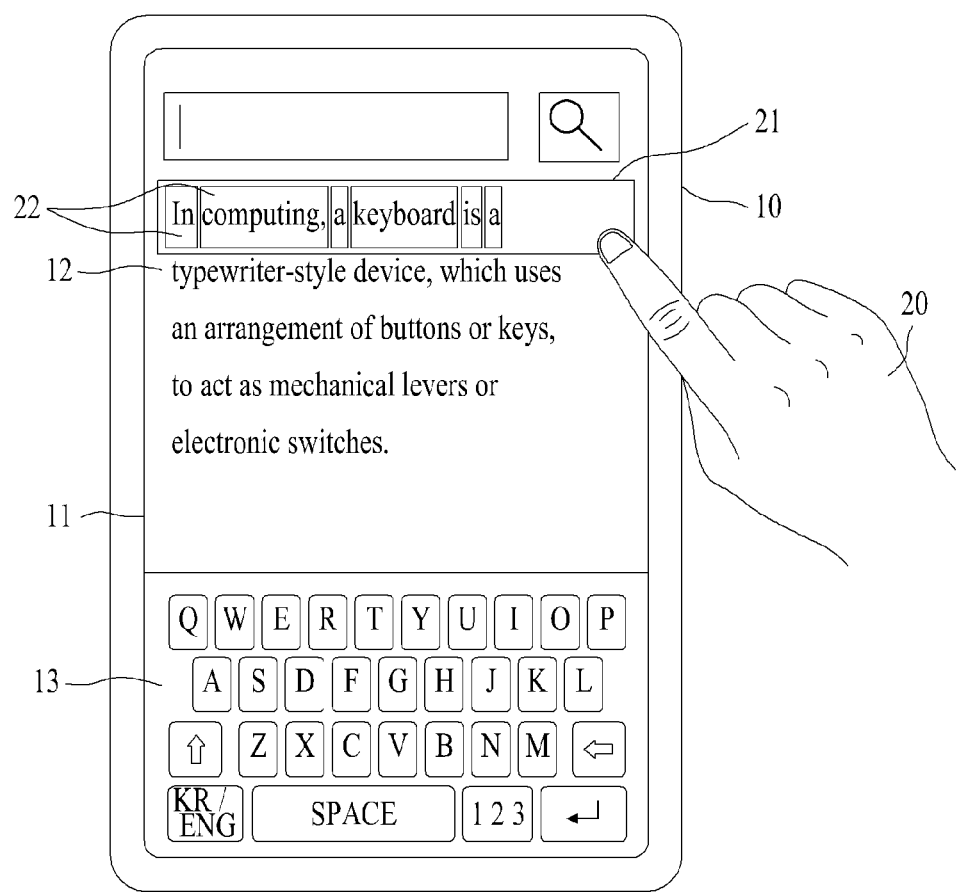

Referring to FIG. 2b, the touch sensitive display device 10 may generate and display the word-selecting interface 21 in response to a position of a contact, which moved to a second area. According to the embodiment, the touch sensitive display device 10 may display the word-selecting interface 21 in the form of a transparent or a semi-transparent bar. Hence, in case that the word-selecting interface 21 overlapped a digital content, a user may check a text included in the digital content. And, the touch sensitive display device 10 may highlight at least one word overlapped by the word-selecting interface.

If the word-selecting interface 21 overlaps the text included in the digital content by the movement of a contact 20, the touch sensitive display device 10 may display the overlapped text in a manner of converting to a soft button by a word-unit. As shown in FIG. 2b, the word-selecting interface 21 may overlap a text 'In computing, a keyboard is a'. The touch sensitive display device 10 may display 'In', 'computing', 'a', 'keyboard', 'is', and 'a' in a manner of converting to soft buttons 22, respectively.

According to the embodiment, the touch sensitive display device 10 may display the text overlapped by the word-selecting interface 21 except a duplicated word in a manner of converting to the soft button 22. For instance, in the text 'In computing, a keyboard is a', since a same word 'a' is repeated twice, the touch sensitive display device 10 converts a single 'a' to a soft button and may be then able to display it.

According to the embodiment, the touch sensitive display device 10 considers a part of speech of a word overlapped by the word-selecting interface 21 and may selectively determine whether the word is converted to a soft button 22. For instance, the touch sensitive display device 10 may display a noun among the text overlapped by the word-selecting interface 21 in a manner of converting to a soft button 22.

And, the touch sensitive display device 10 may additionally display a relation word for the displayed noun word as a soft button. The relation word is a word having a connecting function between words in a sentence when the part of speech is classified according to a function. In this case, the relation word may include a postposition in Korean and a preposition and an article in English. The touch sensitive display device 10 may display the soft button of the relation word as an independent button from the soft button of a noun. And, the touch sensitive display device 10 may display in a manner of adding a relation word to the soft button of the noun.

For instance, in the text 'In computing, a keyboard is a', since 'computing' and 'key' correspond to the noun, the touch sensitive display device 10 may display two words, which are 'computing' and 'key', in a manner of selectively converting to the soft buttons. And, the touch sensitive display device 10 may additionally display the soft buttons of 'In' and 'a', which are the relation words of 'computing' and 'key'.

The touch sensitive display device 10 may deactivate a hyperlink of a word overlapped by the word-selecting interface. The word included in a digital content 12 may include the hyperlink. If a contact is detected from a word including the hyperlink, the touch sensitive display device 10 may perform an operation set to the hyperlink. For instance, the touch sensitive display device 10 may load a different digital content connected by the hyperlink. For the word, which is overlapped by the word-selecting interface, the touch sensitive display device 10 deactivates the hyperlink included in the corresponding word and may activate a soft button function, which shall be explained in the following description.

Figure 3A:
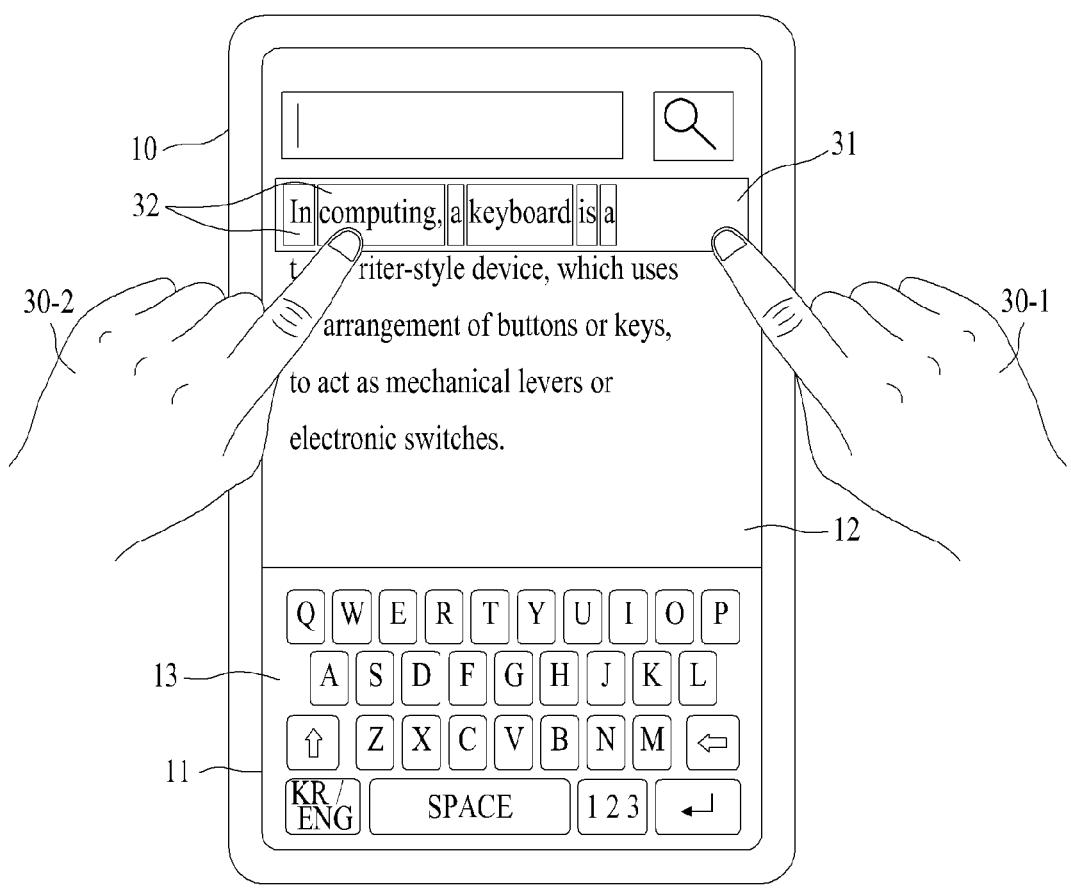
FIGS. 3a/3b is a diagram for showing a method of inputting a text using a word-selecting interface according to one embodiment.

FIGS. 3*a*/3*b* is a diagram for showing a method of inputting a text using a word-selecting interface according to one embodiment. The touch sensitive display device may display soft buttons in the word-selecting interface. The touch sensitive display device may detect a contact from the displayed soft button and may input a text corresponding to the soft button from which the contact is detected.

As shown in FIG. 3*a*, the touch sensitive display device 10 may display a graphic user interface in the display unit 11. The touch sensitive display device 10 displays a virtual keyboard 13 in a first area of the display unit 11 and may display a digital content 12 in a second area.

As described in FIG. 2, the touch sensitive display device 10 may display a word-selecting interface 31 according to a first contact 30-1, which moved from a first area to a second area. The touch sensitive display device 10 may display the text of an area overlapped by the word-selecting interface 31 in a manner of converting to soft buttons 32 by a word-unit. The touch sensitive display device 10 may detect a second contact 30-2 of a user from one of the displayed soft buttons 32. The touch sensitive display device 10 may input the text corresponding to the soft button from which the second contact is detected into a text input box. For instance, if the word-selecting interface 31 overlaps the text 'In computing, a keyboard is a' as shown in FIG. 3*a*, the touch sensitive display device 10 may display 'In', 'computing', 'a', 'keyboard', 'is', and 'a' in a manner of converting to soft buttons 22, respectively. If the second contact 30-2 is inputted on a 'computing' soft button among the displayed soft buttons 32, the touch sensitive display device 10 may input the 'computing' in the text input box.

Figure 3B:
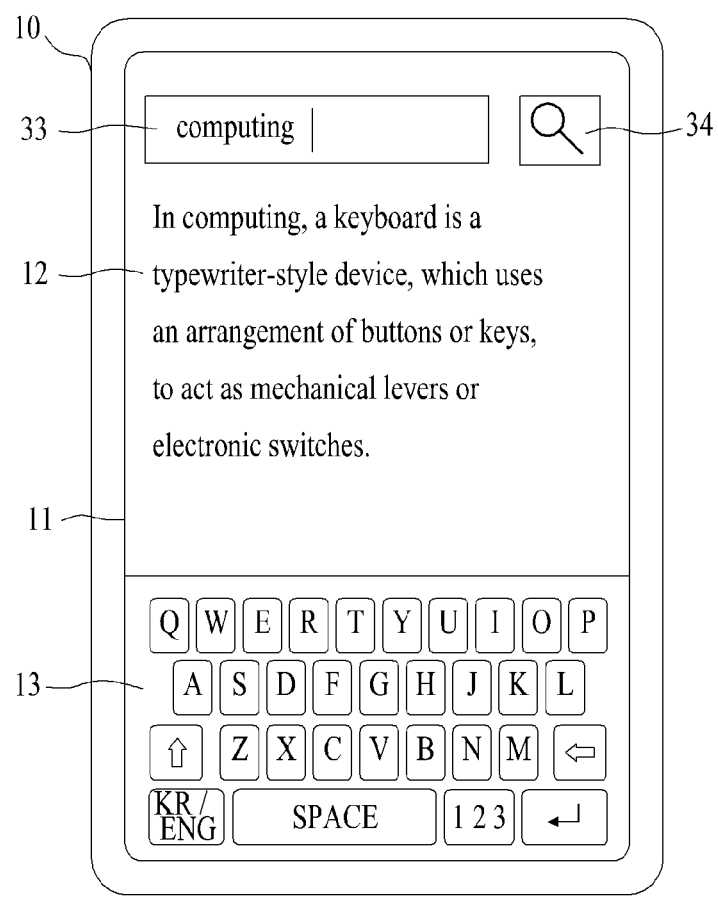

Referring to FIG. 3*b*, the touch sensitive display device 10 may input the 'computing' from which the second contact 30-2 is detected to the text input box 33. If a contact is detected from a displayed search button 34, the touch sensitive display device 10 may display a search result for the 'computing', which is inputted in the text input box 33. The touch sensitive display device 10 may deactivate the word-selecting interface when the first contact 30-1 is released. If the word-selecting interface is deactivated, the touch sensitive display device 10 may exclude the word-selecting interface from the object for displaying in the display unit.

The touch sensitive display device may convert at least one word overlapped by the word-selecting interface in response to the position from which the first contact is detected in a virtual keyboard of the first area. In this case, an operation for converting a word may include such an operation as translating a word, changing to an upper case, and indicating the result of searching for a word starting with a specific letter. And, the touch sensitive display device may convert at least one word overlapped by the word-selecting interface in response to the key of the virtual keyboard displayed in the position from which the first contact is detected. The touch sensitive display device may display at least one or more words overlapped by the word-selecting interface as soft buttons and may display the at least one or more converted words in the displayed soft buttons, respectively. The touch sensitive display device may detect a second contact from the soft button. The touch sensitive display device may input a word displayed in the soft button from which the second contact is detected into a text input box.

Figure 4A:
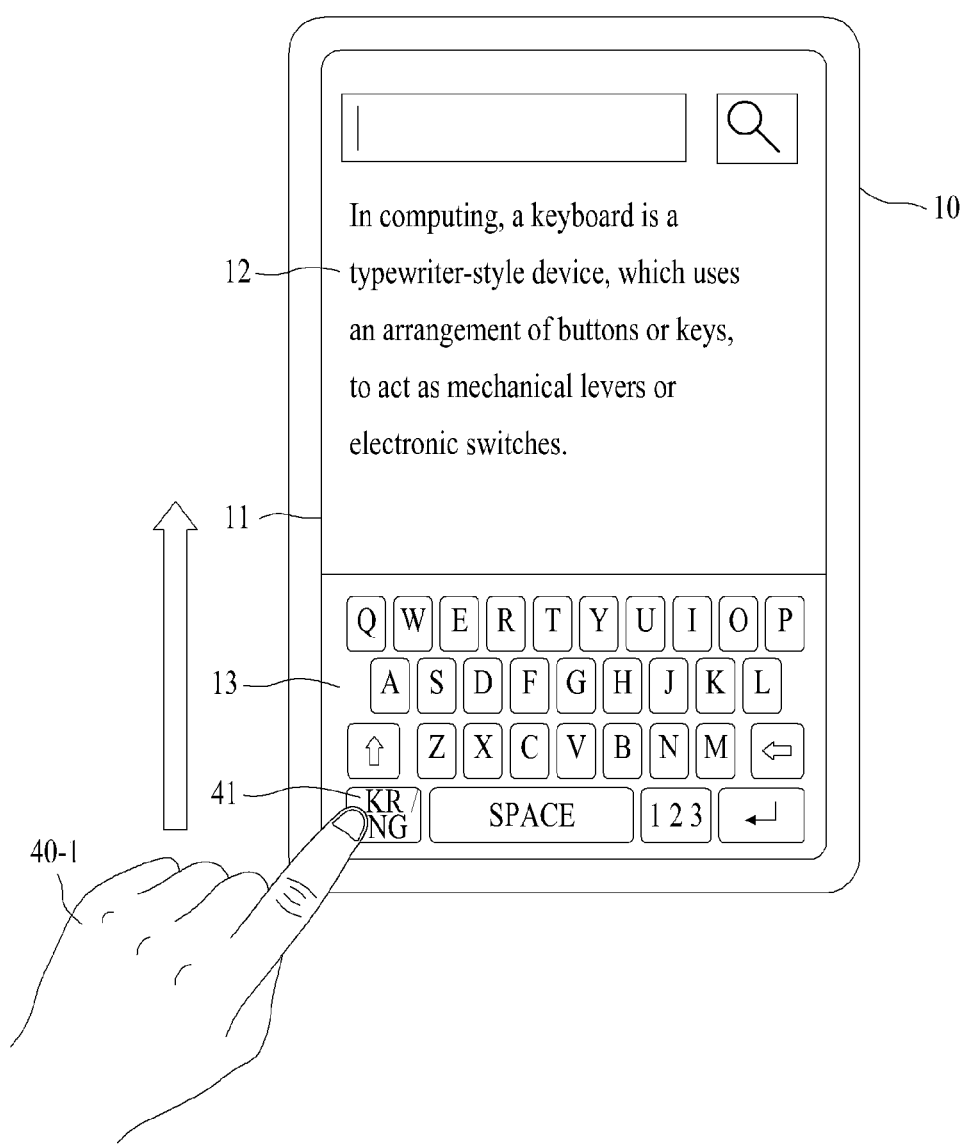
FIGS. 4a/4b is a diagram for showing a method of inputting a translated text using a word-selecting interface according to one embodiment.

FIGS. 4*a*/4*b* is a diagram for showing a method of inputting a translated text using a word-selecting interface according to one embodiment. In case that a first contact is detected from a language shift key, the touch sensitive display device may display the word overlapped by the word-selecting interface in the soft button in a manner of translating into a different language. For instance, the word represented in English may be translated into Korean or the word represented in Korean may be translated into Japanese.

In FIG. 4*a*, the touch sensitive display device 10 may display a graphic user interface in the display unit 11. The touch sensitive display device 10 displays a virtual keyboard 13 in a first area of the display unit 11 and may display a digital content 12 in a second area. The touch sensitive display device 10 may sense a first contact 40-1 with the first area using a sensor unit.

Referring to FIG. 4*a*, the touch sensitive display device 10 may detect the first contact 40-1 from the language shift key 41 of the virtual keyboard. If the detected first contact 40-1 moves to the second area while maintaining the contact with the display unit, the touch sensitive display device 10 may generate a word-selecting interface. The touch sensitive display device 10 may activate the word-selecting interface when the contact passes by the boundary of the first area and the second area.

Figure 4B:
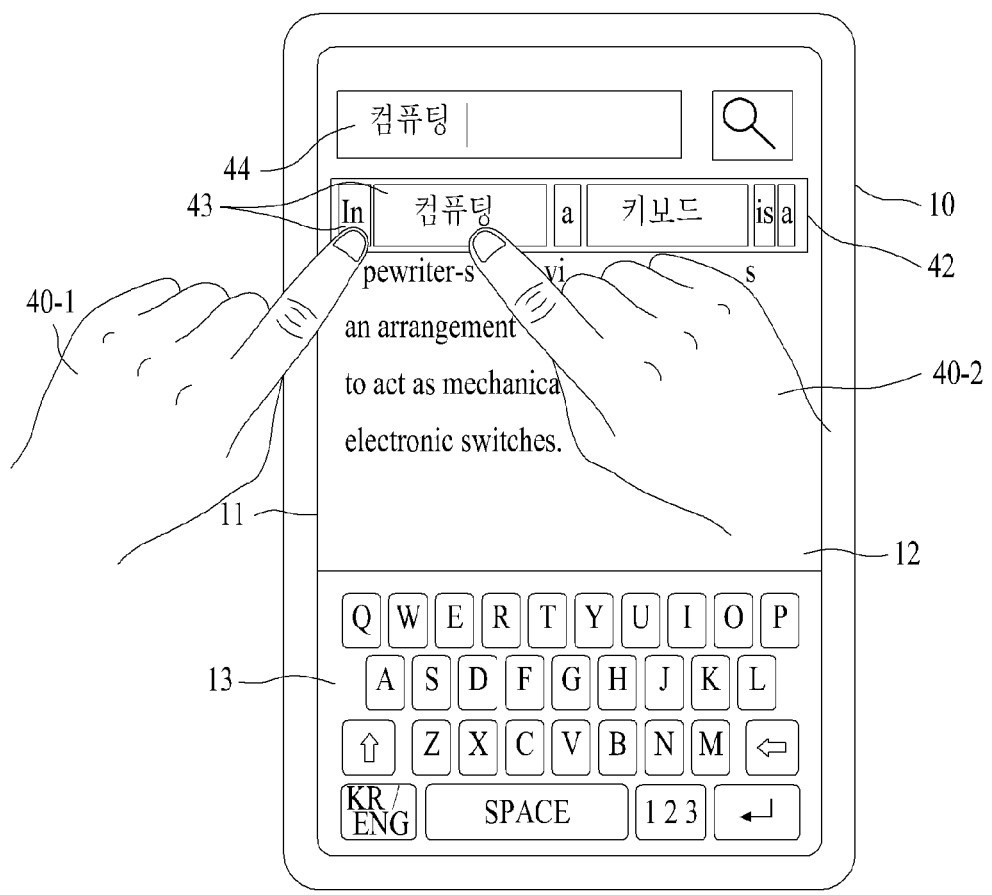

Referring to FIG. 4*b*, the touch sensitive display device 10 may display at least one or more words overlapped by the activated word-selecting interface 42 as soft buttons, respectively. Referring to in FIG. 4*a*, since the first contact 40-1 is detected from the language shift key 41, the touch sensitive display device 10 may translate at least one or more words overlapped by the word-selecting interface into a different language and may display the translated at least one or more words in the soft buttons, respectively. Referring to FIG. 4*b*, since the language shift key 41 is KR/ENG, Korean may be translated into English or English may be translated into Korean.

For instance, if the word-selecting interface overlaps the text 'In computing, a keyboard is a' as shown in FIG. 4b, the touch sensitive display device 10 may display 'In', 'computing', 'a', 'keyboard', 'is', and 'a' in a manner of converting to soft buttons 43, respectively. In this case, the touch sensitive display device 10 may translate 'computing' and 'keyboard' into Korean and display 'computing' and 'keyboard' in Korean in the soft buttons, respectively. The touch sensitive display device 10 may determine whether to translate or whether to display in accordance with the part of speech of each word. According to the embodiment, the touch sensitive display device 10 may translate/display noun only in a manner of extracting the noun as mentioned in the above.

With this, the touch sensitive display device 10 may display the word displayed in the digital content in a manner of translating into a language that a user wants.

The touch sensitive display device 10 may detect a second contact 40-2 from soft buttons 43. The touch sensitive display device 10 may input a word corresponding to the soft button from which the second contact 40-2 is detected into the text input box 44. In this case, the touch sensitive display device 10 may input the word, which has been translated and displayed in the soft button, in the text input box 44. In particular, if the second contact 40-2 is detected from a 'computing' soft button, the touch sensitive display device 10 may input the 'computing' translated into Korean instead of the 'computing' in the text input box 44.

With this, the touch sensitive display device 10 may input the word displayed in the digital content in the text input box in a manner of translating into the language that a user wants. Consequently, the touch sensitive display device 10 may provide the user with the search result for a translated word.

Figure 5A:
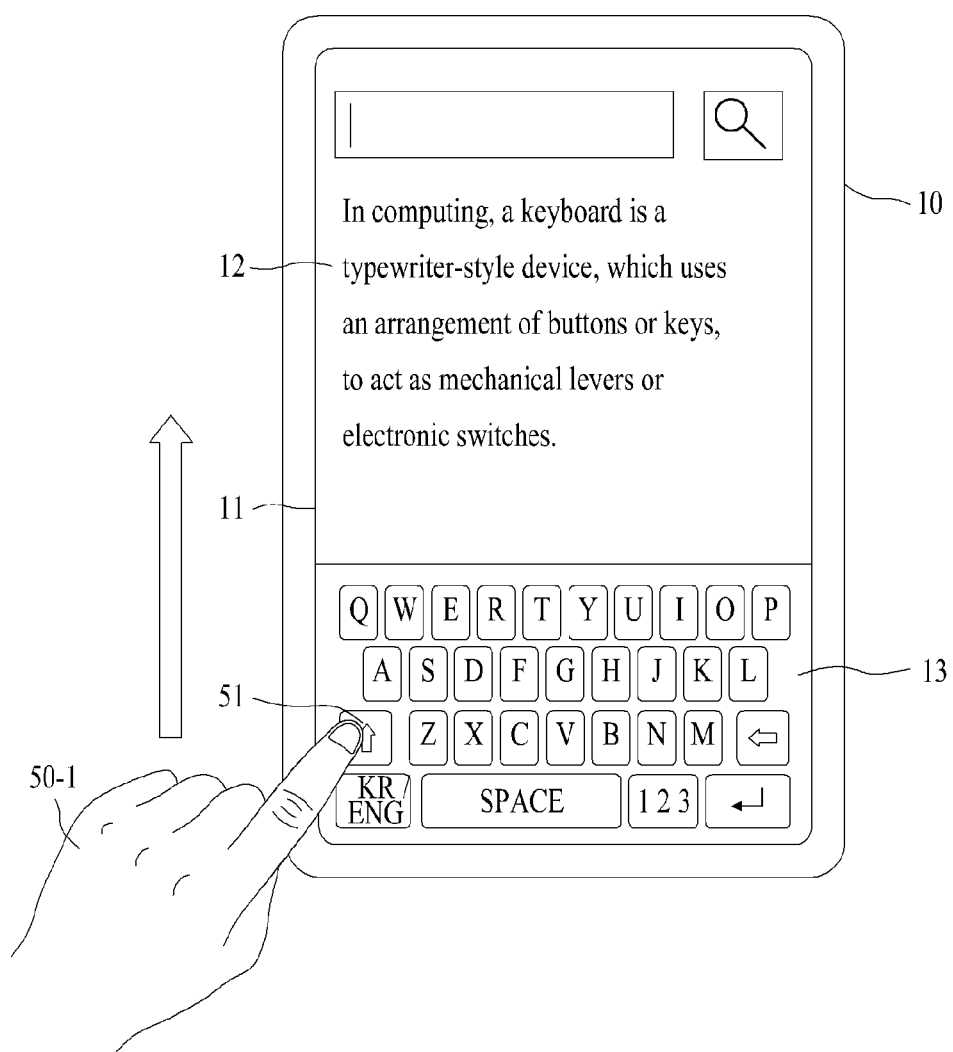
FIGS. 5a/5b is a diagram for showing a method of inputting a text, which is converted to an upper case, using a word-selecting interface according to one embodiment.

FIGS. 5a/5b is a diagram for showing a method of inputting a text, which is converted to an upper case, using a word-selecting interface according to one embodiment. In case that a first contact is detected from a language shift key, the touch sensitive display device may display the word overlapped by the word-selecting interface in the soft button in a manner of converting to an upper case. For instance, the word displayed in lower case alphabet may be converted to the word in upper case alphabet.

Referring to FIG. 5a, the touch sensitive display device 10 may display a graphic user interface in a display unit 11. The touch sensitive display device 10 displays a virtual keyboard 13 in a first area of the graphic user interface and may display a digital content 12 in a second area. The touch sensitive display device 10 may sense a first contact 50-1 with the first area using a sensor unit.

Referring to FIG. 5a, the touch sensitive display device 10 may detect the first contact 50-1 from a shift key of the virtual keyboard. If the detected first contact 50-1 moves to the second area while maintaining the contact with the display unit, the touch sensitive display device 10 may generate a word-selecting interface. The touch sensitive display device 10 may activate the word-selecting interface when the contact passes by the boundary of the first area and the second area.

Figure 5B:
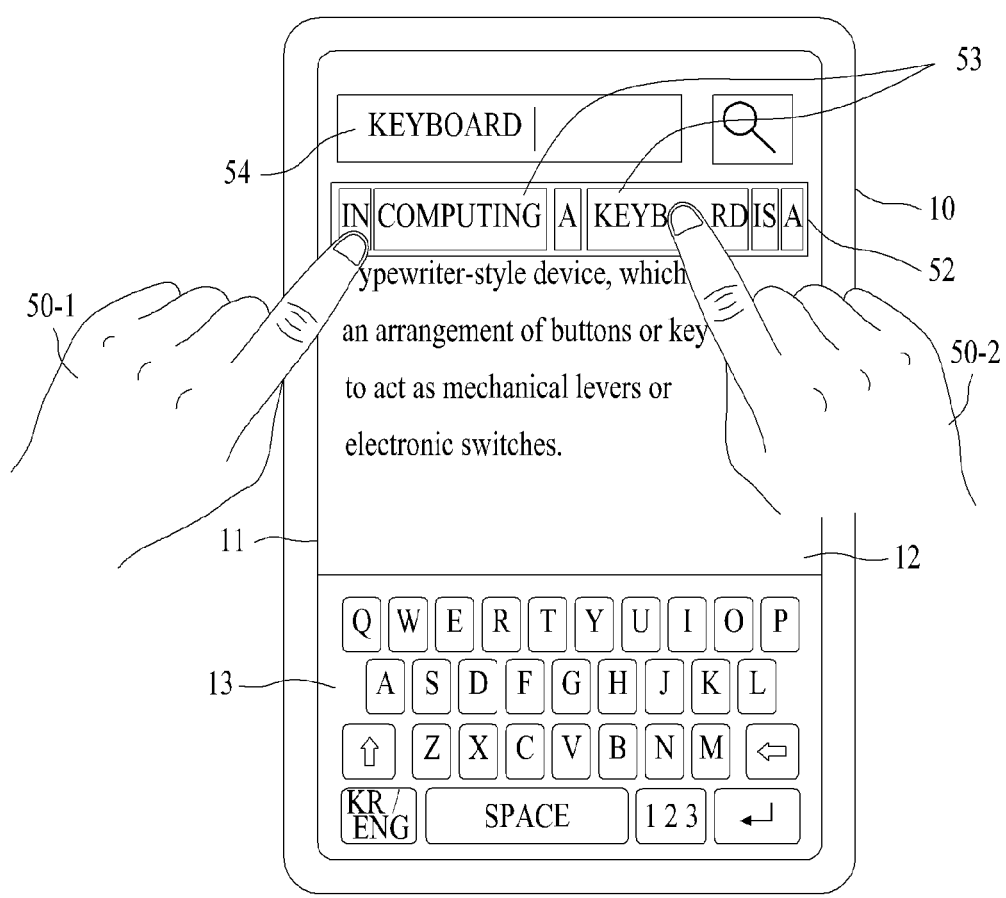

Referring to FIG. 5b, the touch sensitive display device 10 may display at least one or more words overlapped by the activated word-selecting interface 52 as soft buttons, respectively. Referring to FIG. 5a, since the first contact 50-1 is detected from the shift key 51, the touch sensitive display device 10 may convert at least one or more words overlapped by the word-selecting interface to an upper case and may display the converted at least one or more words in the soft buttons, respectively.

For instance, if the word-selecting interface overlaps the text 'In computing, a keyboard is a' as shown in FIG. 5b, the touch sensitive display device 10 may display 'In', 'computing', 'a', 'keyboard', 'is', and 'a' in a manner of converting to soft buttons 53, respectively. In this case, the touch sensitive display device 10 may display 'In', 'computing', 'a', 'keyboard', 'is' and 'a' in a manner of converting to upper case 'IN', 'COMPUTING', 'A', 'KEYBOARD', 'IS', and 'A' in the soft buttons, respectively. With this, the touch sensitive display device 10 may display the word displayed in lower case in the digital content in a manner of converting to upper case. And, the touch sensitive display device 10 may also be able to display the word displayed in upper case in the digital content in a manner of converting to lower case.

The touch sensitive display device 10 may detect a second contact 50-2 from the soft buttons 53. The touch sensitive display device 10 may input a word corresponding to the soft button from which the second contact 50-2 is detected into the text input box 54. In this case, the touch sensitive display device 10 may input the word, which has been converted to upper case and displayed in the soft button, in the text input box 54. In particular, if the second contact 50-2 is detected from a 'COMPUTING' soft button, the touch sensitive display device 10 may input the 'COMPUTING' instead of the 'computing' in the text input box 54.

With this, the touch sensitive display device 10 may input the word displayed in the digital content to the text input box in a manner of converting to an upper case. According to the embodiment, the touch sensitive display device 10 may also be able to input the word displayed in the digital content in upper case to the text input box in a manner of converting to a lower case.

Figure 6A:
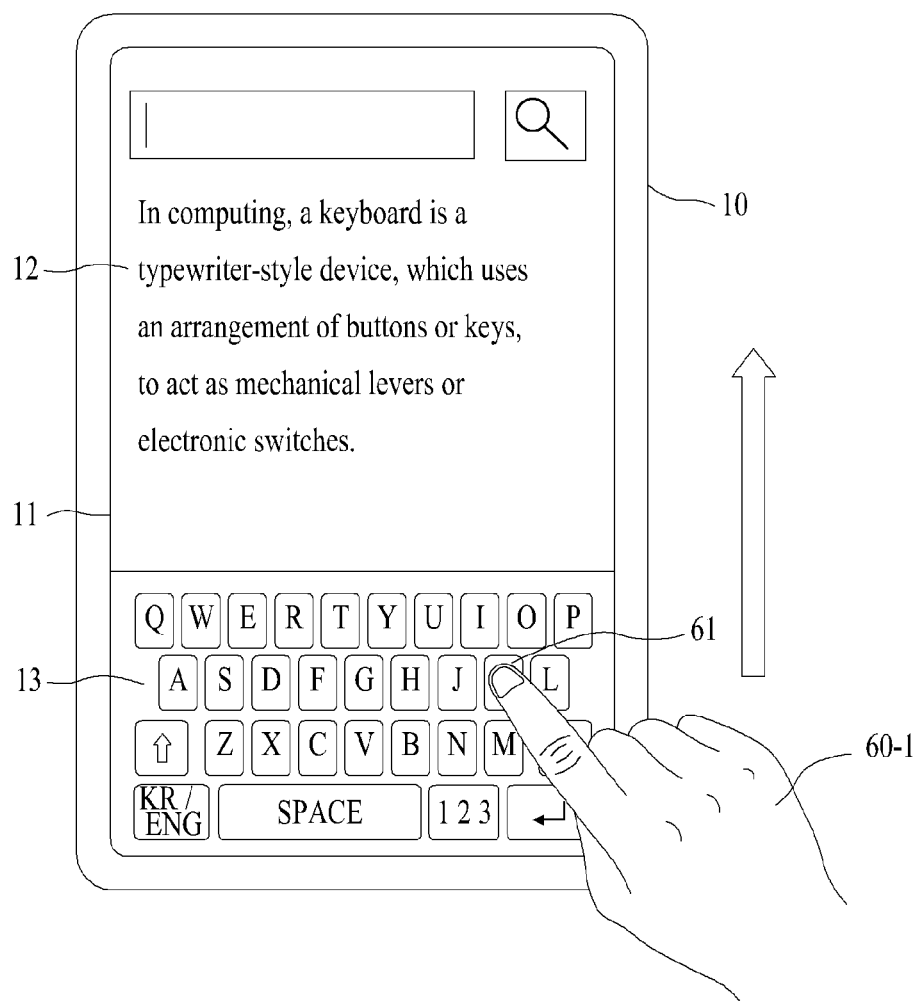
FIGS. 6a/6b is a diagram for showing a method of inputting a text, which is starting with a letter selected by a user, using a word-selecting interface according to one embodiment.

FIGS. 6a/6b is a diagram for showing a method of inputting a text, which is starting with a letter selected by a user, using a word-selecting interface according to one embodiment. In case that a first contact is detected from a letter key, the touch sensitive display device may search for a word starting with the letter from which the first contact is detected among the digital content. The touch sensitive display device may display the searched word in the word-selecting interface as a soft button.

Referring to FIG. 6a, the touch sensitive display device 10 may display a graphic user interface in the display unit 11. The touch sensitive display device 10 displays a virtual keyboard 13 in a first area of the display unit 11 and may display a digital content 12 in a second area. The touch sensitive display device 10 may sense the first contact 60-1 with the first area 13 using a sensor unit.

Referring to FIG. 6a, the touch sensitive display device 10 may detect the first contact 60-1 from a letter key 61 of the virtual keyboard. For instance, the touch sensitive display device 10 may detect the first contact 60-1 from 'K' key 61. If the detected first contact 60-1 moves to the second area while maintaining the contact with the display unit, the touch sensitive display device 10 may generate a word-selecting interface 62. The touch sensitive display device 10 may activate the word-selecting interface when the contact passes by the boundary of the first area and the second area.

Figure 6B:
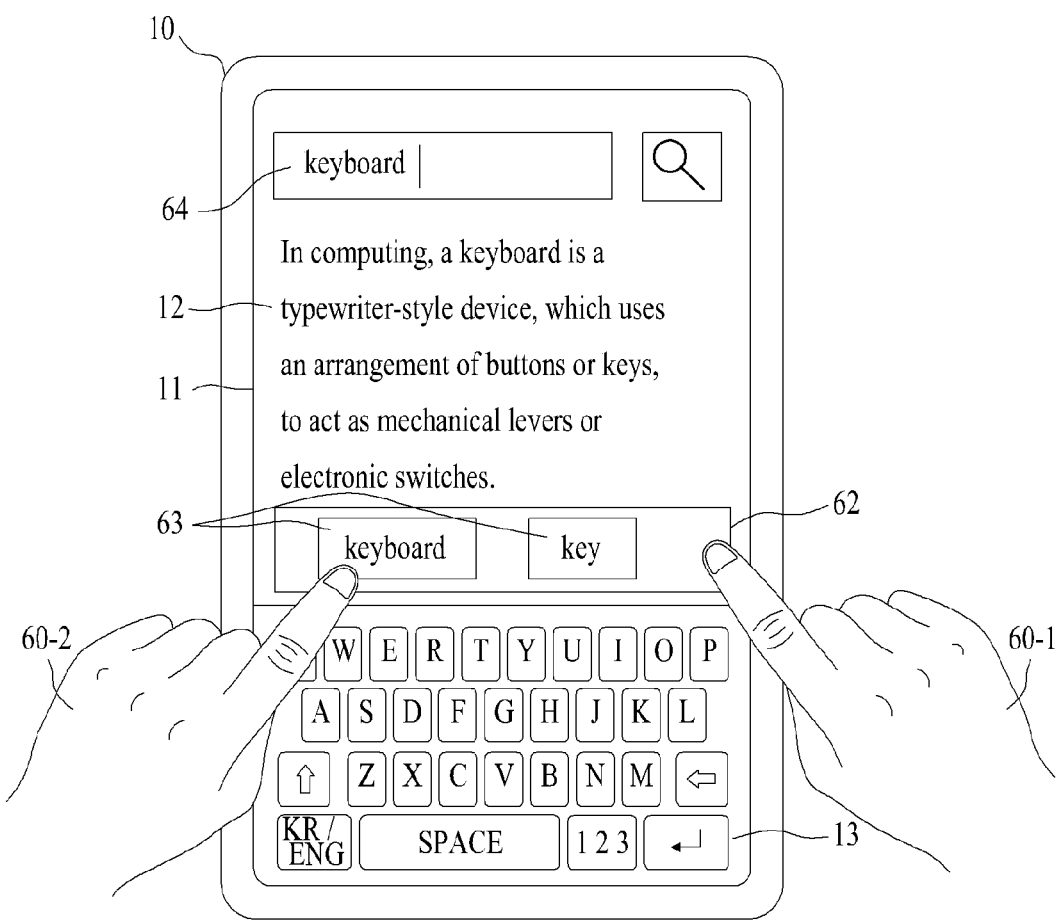

Referring to FIG. 6b, the touch sensitive display device 10 may display the activated word-selecting interface 62 on the top of the virtual keyboard 13. The touch sensitive display device 10 may search for a word included in the digital content based on the letter key 61 from which the first contact 60-1 is detected. In this case, the touch sensitive display device 10 may search for a word in the area of the digital content 12 not displayed as well as in the displayed digital content 12.

Referring to the aforementioned example, since the first contact 60-1 is detected from the 'K' key 61, the touch sensitive display device 10 may search for a word starting with the 'K' in the digital content 12. In particular, the touch sensitive display device 10 may search for 'keyboard' and 'keys'. The touch sensitive display device 10 may display the searched 'keyboard' and 'keys' soft buttons 63 in the word-selecting interface 62.

The touch sensitive display device 10 may detect a second contact 60-2 from a soft buttons 63. The touch sensitive display device 10 may input a word corresponding to the soft button from which the second contact 60-2 is detected into the text input box 64. In this case, the touch sensitive display device 10 may input the word, which is searched for based on the letter key 61 from which the first contact 60-1 is detected, in the text input box 64. In particular, if the second contact 60-2 is detected from a 'keyboard' soft button, the touch sensitive display device 10 may input the 'keyboard' in the text input box 64. With this, the touch sensitive display device 10 may input a word into the text input box in a manner of searching for the word starting with a preferred letter from the digital content.

Figure 7A:
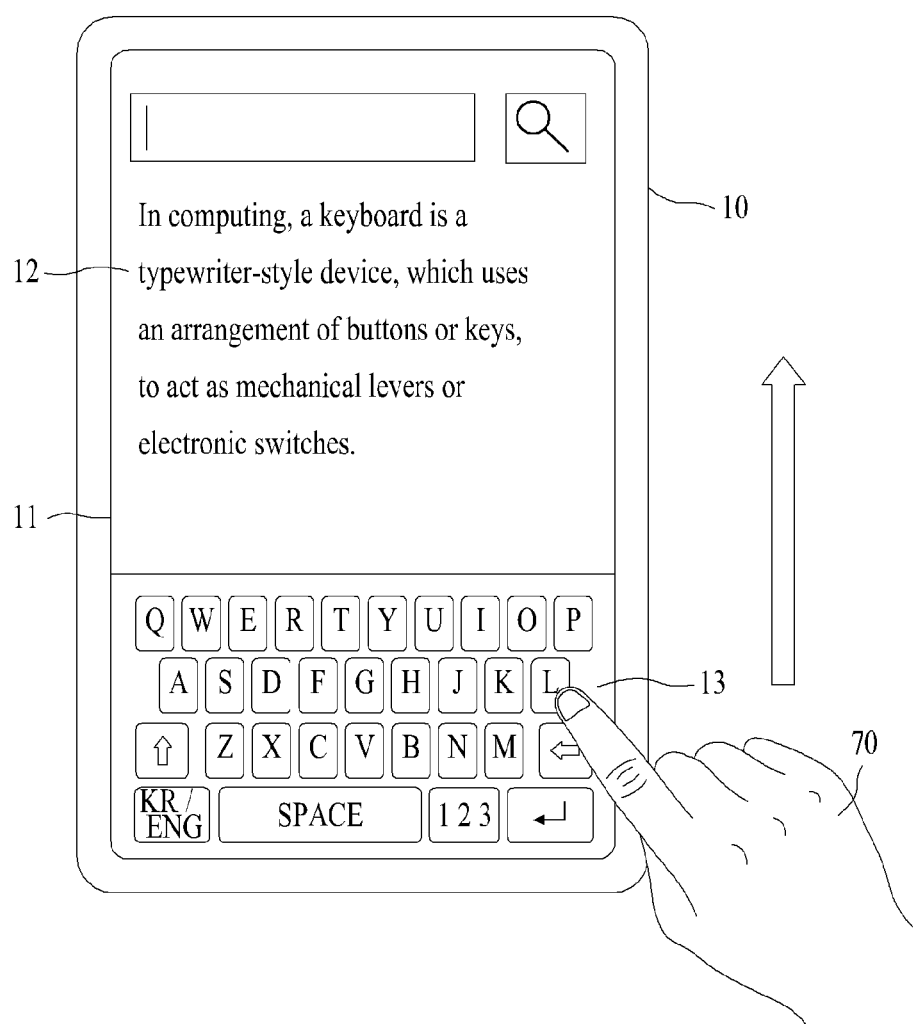
FIGS. 7a/7b is a diagram for showing a method of searching for a keyword from a digital content and a method of generating a word-selecting interface according to another embodiment.

FIGS. 7a/7b is a diagram for showing a method of searching for a keyword from a digital content and a method of generating a word-selecting interface according to another embodiment. The touch sensitive display device may search for a keyword included in a digital content and may be then able to display it in a word-selecting interface as a soft button.

Referring to FIG. 7a, the touch sensitive display device 10 may display a graphic user interface in the display unit 11. The touch sensitive display device 10 displays a virtual keyboard 13 in a first area of the graphic user interface and may display a digital content 12 in a second area. The touch sensitive display device 10 may sense a first contact 70 with the first area using a sensor unit.

Referring to FIG. 7a, the touch sensitive display device 10 may detect a first contact 70 from the virtual keyboard. If the detected first contact 70 moves to the second area while maintaining the contact with the display unit, the touch sensitive display device 10 may generate a word-selecting interface. The touch sensitive display device 10 may activate the word-selecting interface for a keyword search when the contact passes by the boundary of the first area and the second area. According to the embodiment, the word-selecting interface for the keyword search can be activated in case that the first contact 70 is detected from a number key area of the virtual keyboard of the first area.

Figure 7B:
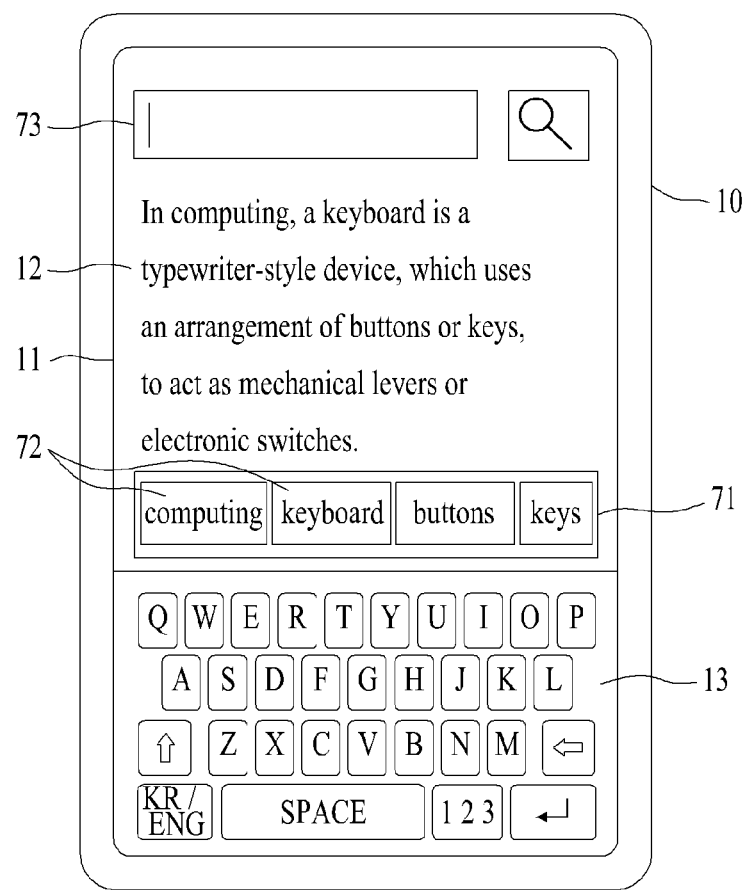

Referring to FIG. 7b, the touch sensitive display device 10 may display the activated word-selecting interface 71 on the top of the virtual keyboard 13. According to the embodiment, the touch sensitive display device 10 may display the word-selecting interface 71 although the first contact 70 is released after the first contact 70 moved to the second area.

The touch sensitive display device 10 may search for a keyword included in a digital content 12. In this case, the touch sensitive display device 10 may search for the keyword in the digital content 12 area not displayed as well as in the displayed digital content 12. The touch sensitive display device 10 may search for a word of high frequency of use as a keyword in the digital content 12. For instance, the touch sensitive display device 10 may arrange the words of the digital content 12 in descending order from the word used most frequently. And, the touch sensitive display device 10 may search for a keyword in response to the part of speech of the word included in the digital content 12. For instance, the touch sensitive display device 10 may search for a noun only as a keyword among the word included in the digital content 12.

The touch sensitive display device 10 may detect a second contact from a soft button 72. The touch sensitive display device 10 may input a keyword corresponding to the soft button from which the second contact is detected into the text input box 73. With this, the touch sensitive display device 10 may input the keyword into the text input box in a manner of searching for the keyword from the digital content.

Figure 8:
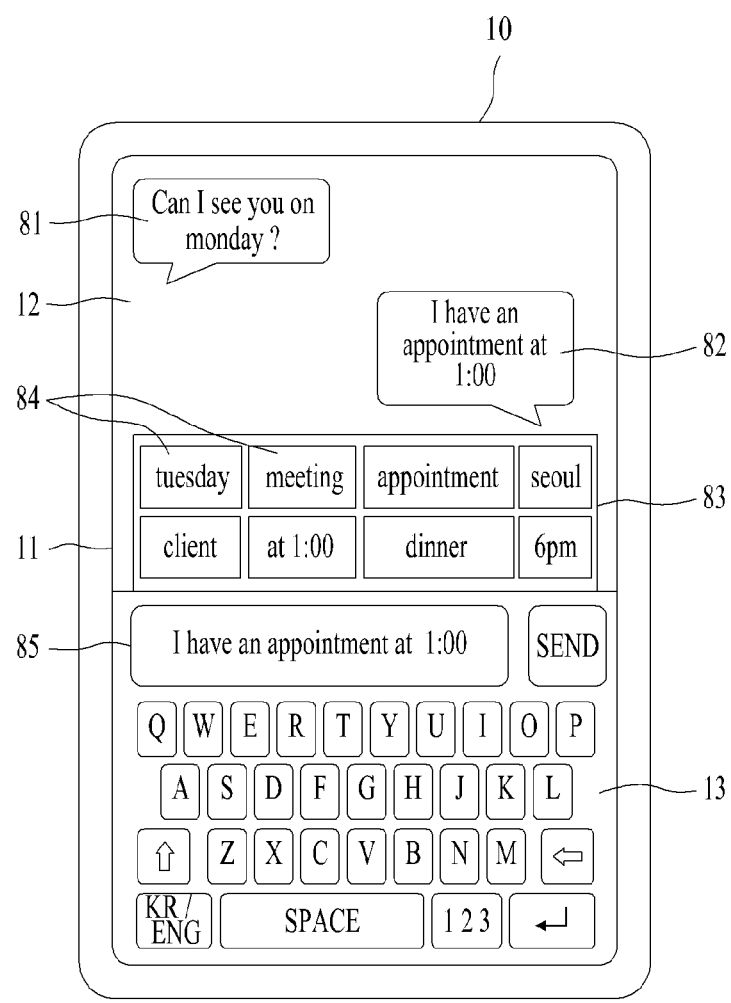
FIG. 8 is a diagram for showing a method of inputting a text message using a word-selecting interface according to another embodiment.

FIG. 8 is a diagram for showing a method of inputting a text message using a word-selecting interface according to another embodiment. The touch sensitive display device may search for an internally stored schedule, a message, contact information, and a memo and may be then able to display them in the word-selecting interface as a soft button.

Referring to FIG. 8, the touch sensitive display device 10 may display a graphic user interface in the display unit 11. The touch sensitive display device 10 displays a virtual keyboard 13 in a first area of the graphic user interface and may display a digital content 12 in a second area. The touch sensitive display device 10 may display a received text message 81. The touch sensitive display device 10 may search for information in response to the received text message 81 and may be then able to display it in the word-selecting interface 83 as a soft button 84. The touch sensitive display device 10 may generate the word-selecting interface 83 on the top of the virtual keyboard 13.

For instance, in case that the received text message 81 is received like 'Can I see you on Monday?', the touch sensitive display device 10 may search for a internally stored schedule information and may be then able to display it in the word-selecting interface 83. In this case, it may be assumed that the internally stored schedule information in the touch sensitive display device 10 may include such a case as a meeting with a client on Monday at 1:00 in Seoul and a dinner appointment at 6 PM. In this case, the touch sensitive display device 10 may extract such a keyword as 'Tuesday', 'meeting', 'appointment', 'Seoul', 'client', 'at 1:00', 'dinner' and '6 PM' and may be then able to display the keywords as soft buttons 84.

A user may write a text message 'I have an appointment at 1:00' to be transmitted to a text input box 85 selectively using the soft buttons 84 proposed by the touch sensitive display device 10. In particular, the user may input 'I have an' using the virtual keyboard and may write the text message to be transmitted 82 'I have an appointment at 1:00' in a manner of contacting such a soft button as the 'appointment' and the 'at 1:00'. Consequently, the touch sensitive display device 10 may provide a user with an effect capable of easily inputting what a user wants by proposing words as soft buttons corresponding to a text message received by the user. In other word, a user may input a user preferred content easily and quickly by using both a method of inputting by a letter-unit using the virtual keyboard and a method of inputting by a word-unit using the word-selecting interface.

Figure 9:
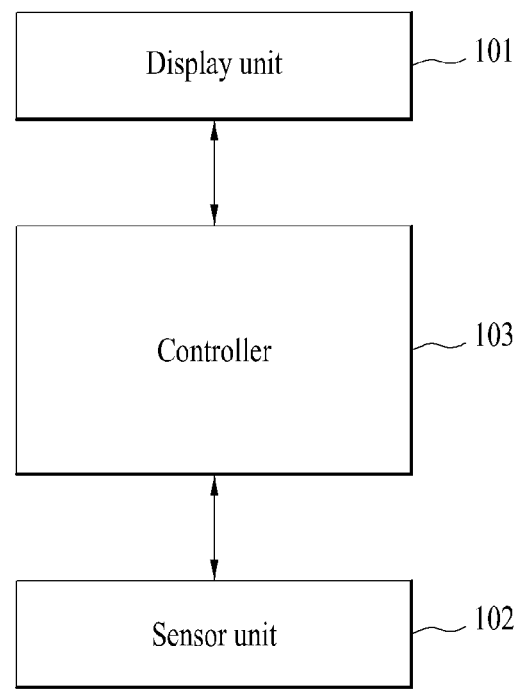
FIG. 9 is a block diagram of a touch sensitive display device according to one embodiment.

FIG. 9 is a block diagram of a touch sensitive display device according to one embodiment. The touch sensitive display device may include a display unit 101, a sensor unit 102, and a controller 103.

The display unit 101 may display a graphic user interface in a display screen. The display unit 101 may display a virtual keyboard in a first area and may display a digital content in a second area. The display unit 101 may display a word-selecting interface. The display unit 101 may display the word-selecting interface transparently or semi-transparently. As a different embodiment, the display unit 101 may highlight a text of the digital content overlapped by the word-selecting interface. Hence, although the word-selecting interface overlaps the displayed digital content, a user may check the displayed digital content. And, the display unit 101 may display a soft button in the word-selecting interface. The user may input a text by a word-unit using the displayed soft button.

A sensor unit 102 may sense a contact of a user with a touch sensitive display device using a sensor and may deliver information on the sensed contact to a controller 103. The sensor unit 103 may deliver the sensed contact to the controller 103 in a manner of converting to an electrical signal. The sensor unit 102 may sense the contact using either a resistive sensor or a capacitive sensor. The sensor unit 102 may sense a first contact with the display unit 101 and a movement of the first contact. The sensor unit 102 may sense a second contact with a displayed virtual keyboard or a soft button and may be then able to deliver the information on the sensed first contact and the second contact to the controller 103. The display unit 101 and the sensor unit 102 can be constructed as a single touch sensitive display unit in a manner of being aggregated.

The controller 103 controls the display unit 101 and the sensor unit 102 and may manage a data transmission/reception between units. And, the controller 103 may execute an application and may process the internal data of the touch sensitive display device.

The controller 103 may detect a user contact from the display unit 101 based on the electrical signal received from the sensor unit 102. If a first contact sensed by the sensor unit 102 moves from the first area to the second area while maintaining the contact with the display unit 101, the controller 103 may activate a word-selecting interface. The controller 103 may activate the word-selecting interface when the contact passes by the boundary of the first area and the second area. The controller 103 may display and move the word-selecting interface according to the first contact that moves. The controller 103 may display a text of the digital content overlapped by the word-selecting interface in a manner of converting to a soft button by a word-unit. And, if a second contact is detected from a soft button, the controller 103 may input a word corresponding to the soft button to a text input box.

As described in FIG. 4 to FIG. 6, the controller 103 may convert at least one word overlapped by the word-selecting interface in response to the position from which the first contact is detected in the virtual keyboard of the first area. For instance, the controller may translate the at least one word overlapped by the word-selecting interface to a different language or convert it to an upper case. The controller 103 may display the converted at least one or more words in soft buttons, respectively. If a second contact is detected from the soft button, the controller 103 may input the converted word displayed in the soft button into the text input box.

As described in FIG. 8, the controller 103 may search for a data internally stored in the touch sensitive display device and may display the searched data in the word-selecting interface as a soft button. If a text message is received, the controller 103 may search for a schedule stored in the touch sensitive display device, a memo, contact information, and a message based on the received text message. The controller 103 may display the searched result in the word-selecting interface as a soft button. And, if a contact is detected from the displayed soft button, the controller 103 may input a search result corresponding to the soft button from which the contact is detected into the text input box.

FIG. 9 is a block diagram according to one embodiment. Blocks represented as being separated are depicted for elements of the touch sensitive display device in a manner of being logically distinguished. Thus, the aforementioned elements of the touch sensitive display device may be equipped with a single chip or a plurality of chips.

Figure 10:
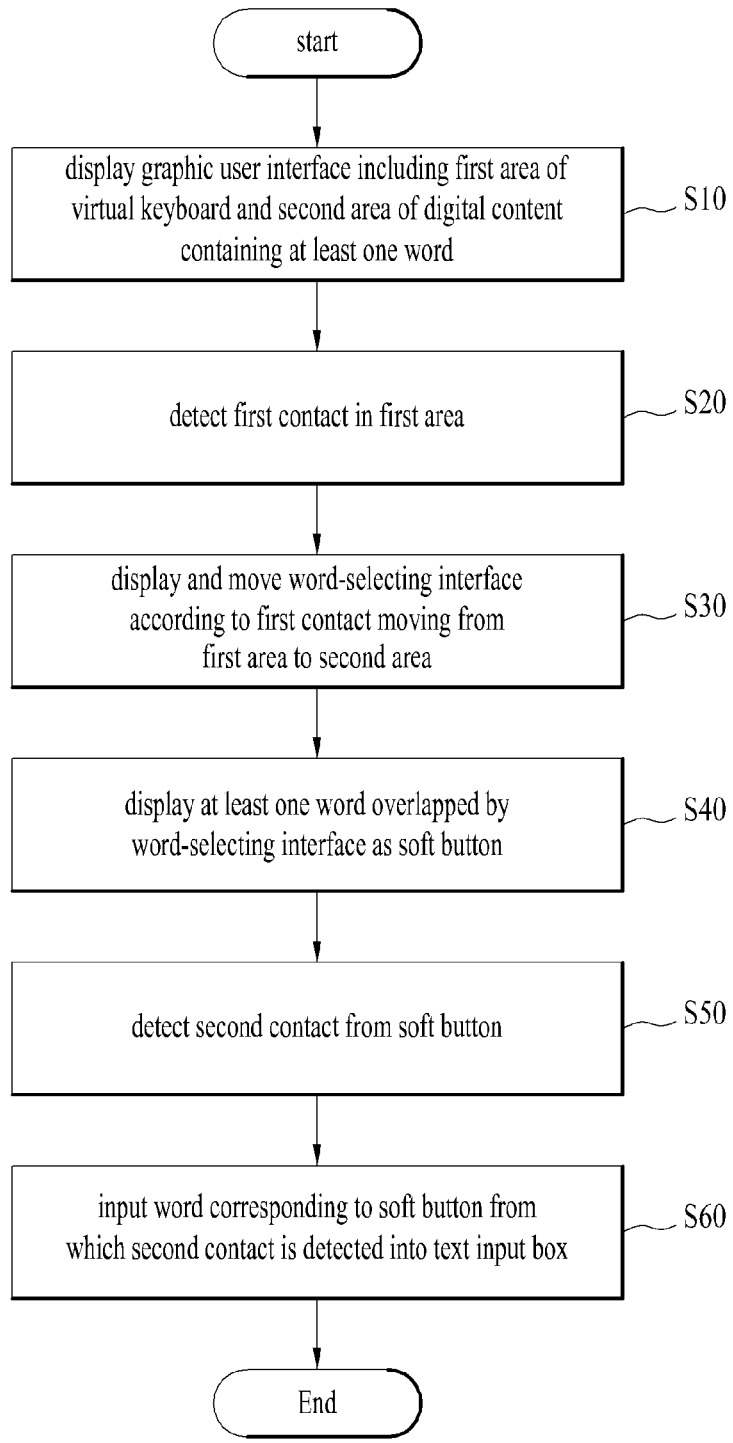
FIG. 10 is a flowchart for showing a text input method of a touch sensitive display device according to one embodiment.

FIG. 10 is a flowchart for showing a text input method of a touch sensitive display device according to one embodiment. The touch sensitive display device may display a graphic user interface including a first area of a virtual keyboard and a second area of a digital content including at least one word using a display unit [S10]. As described in FIG. 1, the touch sensitive display device may display the virtual keyboard in the first area of the display unit. The touch sensitive display device may sense a contact with the virtual keyboard using a sensor unit and may input a letter displayed in the position from which the contact is sensed into a text input box.

The touch sensitive display device may provide a user with a digital content in a manner of displaying it in the second area of the display unit. In this case, the digital content may include a content received via a network as well as the content stored in the touch sensitive display device. The touch sensitive display device may display a text input box together with the digital content. The touch sensitive display device may receive a text intended by a user as an input in the text input box via the virtual keyboard.

The touch sensitive display device may detect a first contact from a first area using a sensor unit [S20]. As described in FIG. 2 to FIG. 7, the touch sensitive display device may detect the first contact from the first area in which the virtual keyboard is displayed. The touch sensitive display device may determine a property of a word-selecting interface, which shall be displayed in the following step, in response to the position from which the first contact is detected. In particular, as described in FIG. 4 to FIG. 6, the touch sensitive display device may determine the property to convert a word overlapped by the word-selecting interface in response to the position from which the first contact is detected.

The touch sensitive display device may display and move the word-selecting interface according to the first contact moving from the first area to the second area using a controller [S30]. As described in FIG. 2 to FIG. 7, the touch sensitive display device may detect a movement of the first contact. The touch sensitive display device may detect the first contact moving from the first area to the second area while maintaining the contact with the display unit. The touch sensitive display device may generate the word-selecting interface when the first contact passes by the boundary of the first area and the second area. The touch sensitive display device may display the word-selecting interface generated by the movement of the first contact by being moved.

The touch sensitive display device may display the word-selecting interface in the form of a bar or a box. And, the touch sensitive display device may display the word-selecting interface transparently or semi-transparently.

The touch sensitive display device may display at least one word overlapped by the word-selecting interface in the digital content as a soft button using a controller [S40]. As described in FIG. 2 to FIG. 7, in case the word-selecting interface overlaps the at least one word, the touch sensitive display device may display the at least one or more words overlapped by the word-selecting interface as soft buttons, respectively. The touch sensitive display device may respectively display the at least one or more words overlapped by the word-selecting interface in a manner of converting to soft buttons in response to the position from which the aforementioned first contact is detected. For instance, the touch sensitive display device may translate the at least one word overlapped by the word-selecting interface, convert it to an upper case, or search for a word starting with a specific letter.

According to the embodiment, the touch sensitive display device may display the at least one or more words overlapped by the word-selecting interface in a manner of highlighting each of them. And, the touch sensitive display device may deactivate a hyperlink of the word overlapped by the word-selecting interface. With this, the touch sensitive display device may execute a function of the soft button instead of executing the hyperlink of the corresponding word when a second contact is detected.

The touch sensitive display device may detect the second contact from a soft button using the sensor unit [S50]. As described in FIG. 3 to FIG. 8, the touch sensitive display device may detect the second contact from the soft button displayed in the word-selecting interface. The second contact detected by the sensor unit may be delivered to the controller in a manner of being converted to an electrical signal.

The touch sensitive display device may input a word corresponding to the soft button from which the second contact is detected into the text input box [S60]. As described in FIG. 3 to FIG. 8, the touch sensitive display device may input a word included in the digital content or may input a converted result of the corresponding word into the text input box. For instance, the touch sensitive display device may input the result of translating a word included in the digital content into a different language, the result of converting to an upper case, or the result of searching for a word starting with a specific letter to the text input box. The touch sensitive display device may execute a search job and the like based on the word inputted in the text input box.

As mention in the foregoing description, the touch sensitive display device may provide a user with an effect capable of inputting one word by a single contact using the word-selecting interface. Thus, compared to a case of using a virtual keyboard to input one letter by one contact, there exists a merit in that a user is able to input a preferred text quickly.

What is claimed is:

1. A touch sensitive display device, comprising:
   a display unit configured to display a graphic user interface;
   a sensor unit configured to sense a contact with the display unit; and
   a controller configured to control the display unit and the sensor unit,
   wherein the graphic user interface comprises a first area of a virtual keyboard and a second area of a digital content containing at least one text,
   wherein the controller:
      detects a first contact in the first area;
      displays and moves a word-selecting interface according to the first contact moving from the first area to the second area,
      converts at least one word within the at least one text to at least one soft button, the at least one word overlapped by the word-selecting interface in the digital content,
      displays the at least one soft button, the at least one soft button including the converted at least one word respectively,
      detects a second contact selecting a soft button among the at least one soft button, and
      inputs a word corresponding to the soft button into a text input box.

2. The touch sensitive display device of claim 1, wherein the control unit converts the at least one word overlapped by the word-selecting interface in response to a position from which the first contact is detected in the virtual keyboard of the first area and wherein the controller displays the converted at least one word in the at least one soft button, respectively.

3. The touch sensitive display device of claim 2, wherein the controller converts the at least one word overlapped by the word-selecting interface in response to a key of the virtual keyboard displayed in the position from which the first contact is detected and wherein the controller displays the converted at least one word in the at least one soft button, respectively.

4. The touch sensitive display device of claim 2, wherein if the second contact is detected from the soft button, the controller inputs the converted word displayed in the soft button into the text input box.

5. The touch sensitive display device of claim 1, wherein if the first contact is detected from a language shift key area of the virtual keyboard of the first area, the controller translates the at least one word overlapped by the word-selecting interface and wherein the controller displays the translated word in the at least one soft button, and wherein the controller inputs the translated word into the text input box.

6. The touch sensitive display device of claim 1, wherein if the first contact is detected from a letter key area of the virtual keyboard of the first area, the controller searches for a word starting with the letter in the digital content and wherein the controller displays the searched word as the at least one soft button.

7. The touch sensitive display device of claim 1, wherein if the first contact is detected from a number key area of the virtual keyboard of the first area, the controller preferentially displays a word of high frequency of use in the digital content as the at least one soft button.

8. The touch sensitive display device of claim 1, wherein if the first contact is detected from a shift key area of the virtual keyboard of the first area, the controller displays the at least one word overlapped by the word-selecting interface in the at least one soft button in a manner of converting to an upper case and wherein the controller inputs the word displayed in the upper case into the text input box.

9. The touch sensitive display device of claim 1, wherein the controller activates the word-selecting interface when the first contact passes by a boundary of the first area and the second area.

10. The touch sensitive display device of claim 1, wherein the controller deactivates the word-selecting interface when the first contact is released.

11. The touch sensitive display device of claim 1, wherein the word-selecting interface overlaps one or more text lines.

12. The touch sensitive display device of claim 11, wherein the sensor unit senses a third contact for controlling a size of the word-selecting interface and wherein the controller controls the size of the word-selecting interface according to the sensed third contact.

13. The touch sensitive display device of claim 1, wherein if duplicated word among words overlapped by the word-selecting interface exists, the controller displays one of the duplicated words as the at least one soft button.

14. The touch sensitive display device of claim 1, wherein the controller selectively displays the word overlapped by the word-selecting interface in the digital content as the at least one soft button according to a part of speech of the word.

15. The touch sensitive display device of claim 14, wherein the controller selectively displays the word that the part of the speech is a noun among the words overlapped by the word-selecting interface in the digital content as the at least one soft button.

16. The touch sensitive display device of claim 15, wherein the controller further displays a relation word for the displayed noun as the at least one soft button.

17. The touch sensitive display device of claim 1, wherein the controller indicates the at least one word overlapped by the word-selecting interface in a manner of highlighting.

18. The touch sensitive display device of claim 1, wherein the word-selecting interface is displayed in the form of a transparent bar or a semi-transparent bar.

19. The touch sensitive display device of claim 1, wherein the controller deactivates a hyperlink of the at least one word overlapped by the word-selecting interface.

20. The touch sensitive display device of claim 1, wherein the sensor unit delivers the sensed contact to the controller in a manner of converting to an electrical signal and wherein the controller detects the contact based on the electrical signal.

21. A method of controlling a touch sensitive display device, the method comprising:
 displaying a graphic user interface including a first area of a virtual keyboard and a second area of a digital content containing at least one text using a display unit;
 detecting a first contact from the first area using a sensor unit;
 displaying and moving a word-selecting interface according to the first contact moving from the first area to the second area using a controller;
 converting at least one word within the at least one text to at least one soft button, the at least one word overlapped by the word-selecting interface in the digital content;
 displaying the at least one soft button, the at least one soft button including the converted at least one word respectively;
 detecting a second contact selecting a soft button among the at least one soft button; and
 inputting a word corresponding to the soft button into a text input box.

* * * * *